US008626494B2

(12) United States Patent
Van den Berghe

(10) Patent No.: US 8,626,494 B2
(45) Date of Patent: Jan. 7, 2014

(54) DATA COMPRESSION FORMAT

(75) Inventor: Guido Van den Berghe, Sint-Amands (BE)

(73) Assignee: Auro Technologies NV, Mol (BE)

( * ) Notice: Subject to any disclaimer, the term of this patent is extended or adjusted under 35 U.S.C. 154(b) by 1039 days.

(21) Appl. No.: 12/652,406

(22) Filed: Jan. 5, 2010

(65) Prior Publication Data

US 2010/0153098 A1    Jun. 17, 2010

Related U.S. Application Data

(63) Continuation-in-part of application No. 11/116,216, filed on Apr. 28, 2005.

(60) Provisional application No. 60/567,041, filed on Apr. 30, 2004.

(51) Int. Cl.
    *G10L 19/00* (2013.01)
(52) U.S. Cl.
    USPC ........................................ 704/200.1; 704/500
(58) Field of Classification Search
    USPC ...................... 704/500–504, 200.1
    See application file for complete search history.

(56) References Cited

U.S. PATENT DOCUMENTS

| | | | |
|---|---|---|---|
| 4,876,719 A | 10/1989 | Nakagami et al. | |
| 5,400,433 A | 3/1995 | Davis et al. | |
| 5,796,844 A | 8/1998 | Griesinger | |
| 5,852,800 A | 12/1998 | Modeste et al. | |
| 5,862,228 A | 1/1999 | Davis | |
| 6,055,502 A | 4/2000 | Kitamura | |
| 6,226,616 B1 * | 5/2001 | You et al. | 704/500 |
| 6,405,163 B1 | 6/2002 | Laroche | |
| 2003/0002683 A1 | 1/2003 | Vaudrey et al. | |
| 2006/0098827 A1 | 5/2006 | Paddock et al. | |

FOREIGN PATENT DOCUMENTS

| | | |
|---|---|---|
| EP | 0 757 506 | 2/1997 |
| EP | 0757506 A2 | 2/1997 |
| WO | WO 2005/003927 | 1/2005 |

OTHER PUBLICATIONS

Official Communication from European Patent Office dated Jun. 27, 2012, in European Patent Application 10183788.8.
European Search Report dated May 16, 2011 in corresponding European Application No. 10183793.
European Search Report dated May 20, 2011 in corresponding European Application No. 10183788.
Office Action received in corresponding European Application No. 05009434.1-2225.
Official Communication from European Patent Office dated Jul. 21, 2011, in European Patent Application 05009434.1.

(Continued)

*Primary Examiner* — Duc Nguyen
*Assistant Examiner* — Kile Blair
(74) *Attorney, Agent, or Firm* — Bacon & Thomas, PLLC

(57) ABSTRACT

An encoder for compressing a plurality of independent mono audio channels into a recording and generating a restricted set of additional parameters used to master an audio track of a storage device is described. The plurality of independent mono audio channels are constructed such that the storage device can be played using solid state disk player so that in a first mode all of the plurality of independent mono audio channels are played as the recording and in a second mode the original channels are reconstructed using a higher sample rate. A corresponding decoder and an audio system comprising such encoder and decoder are also described.

14 Claims, 2 Drawing Sheets

(56) References Cited

OTHER PUBLICATIONS

Office Action cited in parent U.S. Appl. No. 11/116,216 dated Dec. 14, 2009.
Faller et al; "Binaural Cue Coding Applied to Stereo and Multi-Channel Audio Compression," Audio-Engineering Society Convention paper 5574, May 2002.
Kate, "Compatibility Matrixing of Multichannel Bit-Rate-Reduced Audio Signals," Phillips Research Laboratories, Journal Audio Engineering Society, vol. 12, No. 12, Dec. 1995.
Official Communication from European Patent Office in corresponding European Application No. 05009434.1-2225 dated Jan. 10, 2008.
Official Action received in Parent U.S. Appl. No. 11/116,216.

* cited by examiner

DATA COMPRESSION FORMAT

TECHNICAL FIELD OF THE INVENTION

The present invention relates to data storage compression techniques, e.g. for solid state or optical disk such as DVD (Digital Versatile Disk). More particularly the present invention will be described with reference to the solid state disk, but it is not limited to this form of recording or storage. This solid state disk format may for example be a flash disk as used in media player devices. The data being stored may for example be digital pulse code modulated PCM data as used for audio representation.

BACKGROUND OF THE INVENTION

Generally, solid state media player devices typically make use of data compression schemes for example Mpeg 1/2, Mp3, AC3, DTS for audio compression, or other compressions schemes for video data. For audio compression, nearly all of this compression techniques make use of analysis of the audio in the frequency domain, requi-ring e.g. Fourier transforms as part of the encoding (compression) process. Apart from specific frequency band/information being discarded during the encoding/decoding process which is believed not being perceivable by the human ear, such schemes require a transformation (e.g. Fourier) during the decode process resulting in a high load on the central processing unit and resulting in a certain latency on the data being processed. Without the complementary decoder/compressor, such compressed audio formats cannot be played. This invention, using processing steps of techniques from 'multi-channel compatible stereo recording', will be discussed with audio as an example of data to be processed, but it is not restricted to such use.

SUMMARY OF THE INVENTION

It is an object of the present invention to provide a compression/decompression scheme, which does not generate a high cpu load during playback, saving battery power of such (solid state) player devices. It furthermore does not require any decompressor or decoder for basic playback, resulting in basic playback without any decoder or decompressor required, only introducing a few samples latency between the data as read from the storage device when a decompressor would be used, and the samples send to the Digital Analogue Convertor or send to another processing module in the data processing chain. This present invention uses several of the preparation processing as required in the method 'Multi channel compatible stereo recording' but in this invention we focus on other aspects of such processing steps, with solid state playback devices as an example of an embodiment.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a first aspect, the present invention provides a compressor for reducing a plurality of independent mono audio channels into mono audio channels requiring less samples per time and a restricted set of additional parameters used to master an audio track of a storage device, the plurality of independent mono audio channels being constructed such that the storage device can be played using a solid state disk player so that in a first mode all of the plurality of independent mono audio channels are played as the recording requiring less data per second and in a second mode at least one of the independent mono audio channels can be played such that its frequency bandwidth is perceived to be identical to the original mono audio channel.

The storage device may be a solid state disk, such as e.g. flash memory in portable media player devices.

In an encoder according to an embodiment of the present invention, preferably the restricted set of additional parameters do not exceed a data size which can be embedded in the least significant bits of the samples In a second aspect, the present invention provides a decompressor for playing in a first mode, a plurality of independent mono audio channels in a recording using a restricted set of additional parameters used to master an audio track of a storage device, when reading only the audio stereo recording and the additional parameters from the storage device and in a second mode at least one of the plurality of independent mono audio channels can be played such that its frequency bandwidth is perceived to be identical to the original mono audio channel.

The reconstructed channels may be uncorrelated, and perceptually substantially identical to the original mono channels.

In a decoder according to an embodiment of the present invention, the restricted set of additional parameters provide sufficient information to the decompressor, to recreate the missing frequency information such that a single or more mono channels are preceived as identical to the original mono channels during real-time playback.

In a third aspect, the present invention provides an audio system comprising an encoder (data compressor) according to an embodiment of the present invention and a decoder (data decompressor) according to an embodiment of the present invention.

In an audio system according to embodiments of the present invention, the decoder may have means for executing the inverse operation of the encoder and both decoder and encode may be implemented in 32 bit integer arithmetic, being independent of floating point implementation. The encoder first generates approximated audio channels using audio filter parameters generated as floating point values first, which are results from optimization with user configurable targets, which may include perceptual audio characteristics. The audio system may further comprise conversion to integer arithmetic, the encoder and/or decoder having means to compensate for rounding and conversion errors as to provide a decoder process which is the inverse operation of encoding.

In an audio system according to embodiments of the present invention, audio filter parameters required by the decoder and which are a part of the Data Parameter set, may be regenerated for every time period which is short compared to the audio resolution of the human ear.

In an audio system according to embodiments of the present invention, the encoder may incorporate a dynamic compressor which prevents overshoots when reducing the data size (sample rate) of the audio samples In a further aspect, the present invention provides an encoder for compressing a plurality of independent mono audio channels into a recording and generating a restricted set of additional parameters used to master an audio track of a storage device, each audio channel comprising a first number of samples per unit time, the plurality of independent mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In still a further aspect, the present invention provides a decoder for decoding a plurality of recorded mono audio channels from a recording using a restricted set of additional parameters for mastering an audio track of a storage device, each audio channel being reconstructed from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In yet a further aspect, the present invention provides a storage device having stored thereon a plurality of recorded mono audio channels in a recording using a restricted set of additional parameters for mastering an audio track of the storage device, each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The format which may be used with the present invention uses the least significant bits of the audio channels to store additional data. One part of this data, the filter data section, defines several audio filter parameters. Another part, the midi data section, defines data used for midi compatible devices. Lyrics for sing-along may be integrated within the midi section of the data.

In one aspect of the present invention the audio filter data section contains midi data to control digital (midi) controlled devices, like digital pianos or player pianos or other midi controlled musical instruments, midi controller light equipment, or virtually anything what is midi compatible.

In another aspect of the present invention the audio filter data section is the result of a complex encoding scheme. In combination with Lyrics TV output or a small hand held screen and or midi capable devices, like e.g. automated musical instruments, this format is one unique format and solution to several different features: like Karaoke or Sing-along, or play-along, or even automated play-along & sing-along, when midi data is used to display Lyrics as well as to control an automated player instrument.

In another aspect of the present invention, a recording technique is provided, for recording a plurality of mono channels each having an original sampling rate, wherein, each mono channel is redefined using at most half of its original sampling rate and a limited set of extra parameters. The sampling rate of the redefined mono channels may be defined by the compression rate/reduction desired, e.g. half of the original sampling rate of the mono channels if a data size reduction of 50% is desired, or it is a quarter of the original mono channel sampling rate if 75% reduction is required. etc. As an example only, if a 16-bit mono channel with a sampling rate of 44 kHz is reduced, according to the present aspect of the invention this mono channel is redefined as a 15-bit mono channel with a sampling rate of 22 kHz. The redefining of a 15-bit mono channels may be performed by taking, only the even samples. As another example, if a 16-bit mono channel with a sampling rate of 44 kHz are is reduced, the mono channel may be redefined as a 14-bit channel with a sampling rate of 11 kHz. The redefining of the 16-bit mono channel may be performed by taking from the channel every $4k^{th}$ sample. Depending on the amount of sample rate reduction, more least significant bits have to be preserved to store the restricted set of additional data parameters.

In a further aspect of the present invention, an almost equivalent mono channel may be obtained from the redefined mono channel and the limited set of additional parameters, for example by interpolating samples which have been discarded during the redefining process. This means that from the recorded redefined mono channel, e.g. a 15-bit mono channel with a sampling rate of 22 kHz or a 14-bit mono channels with a sampling rate of 11 kHz, together with the set of supplementary parameters, approximated original 16-bit mono channels having a sampling rate of 44 kHz can be obtained.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In one aspect, the present invention proposes audio compression & decompression.

1. Basic Principle.

The present aspect of the present invention relates to encoding of a plurality of channels into an audio signal so that the original audio streams can be reconstructed from the audio signal.

One example of the present invention is described with reference to a channel encoding and decoding but the present invention is not limited thereto. The more the sample rate is reduced, the more samples have to be calculated using a filter and the lower the quality of the reproduced music may be, but in some applications music quality is not of prime importance.

As an example to illustrate this, there is started from a mono 44.1 kHz 16 bit digital audio stream A.

An approximation technique is used.

Pulse Code Modulation (PCM) is used to sample analog audio into digital code, typically at 8000 samples/sec. The digital audio string is then referred to as a PCM stream.

Figure 1:
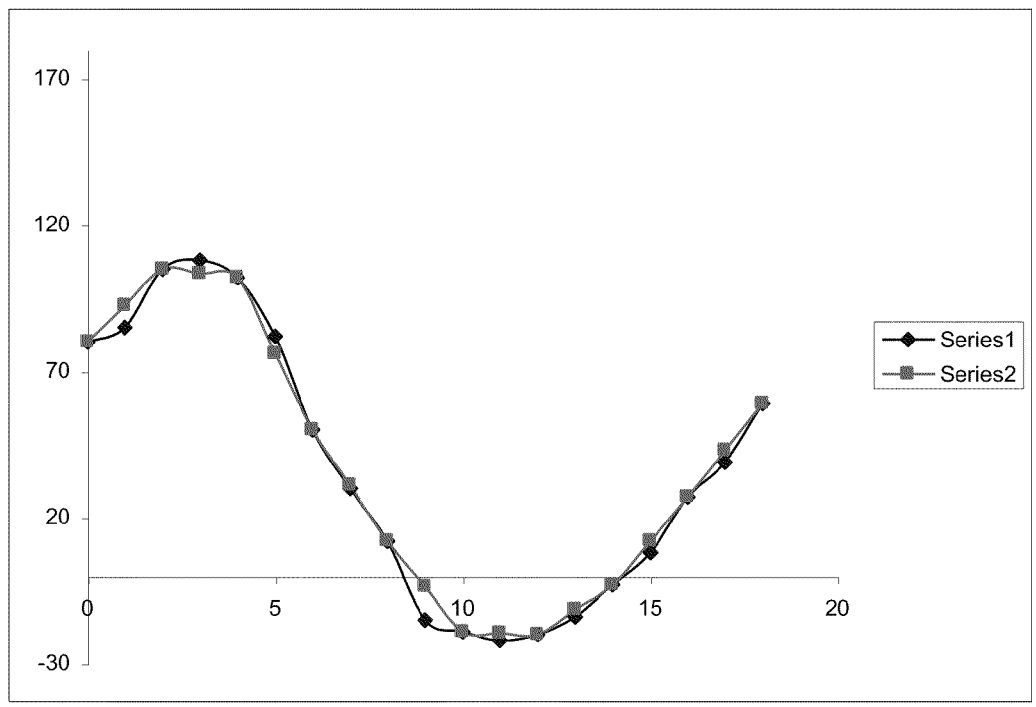
FIG. 1 illustrates a first audio stream A (series 1) and an approximated audio stream A' (series 2).

In FIG. 1, a PCM audio stream A is shown in the graph as a dark gray line (series 1). Samples of first audio stream A are: $A_0, A_1, A_2, A_3, A_4, A_5, \ldots$. From this sample series, a new stream A' is generated (light gray, series 2). The new stream A' is an approximation of the first audio stream A, using linear interpolation to approximate the odd samples of the newly generated stream A', while copying the even samples.

Samples of stream A' are: $A'_0, A'_1, A'_2, \ldots$ with $A'_{2i}=A_{2i}$ & $A'_{2i+1}=(A'_{2i}+A'_{2i+2})/2$. All even samples of the newly generated sample series are thus identical to the original data and all odd samples are defined as the linear interpolation of the next and previous sample.

With this basic principle in mind, it can be concluded that as part of the compression scheme, only the even samples $A'_0$, $A'_2$, $A'_4$ are stored, with a parameter indicating that half the sampling rate has to be used during playback and a basic additional parameter specifying linear interpolation should be used during decoding to regenerate an approximation of the original audio stream. It is further understood that for a person skilled in the art, prior to reducing the channels sample by factor 2, reducing the bit resolution to e.g. 15 bit (from a 16 bit signal) is trivial; it only requires for example to define or set the least significant bit to 0.

2. Restrictions and Limitations of Basic Principle.

The basic idea as explained in previous section to compress and decompress a mono PCM stream has several limitations and restrictions.

Approximation of a PCM stream, using linear interpolation to approximate the odd samples of one stream, results in loss of higher frequency information of the original PCM stream. Therefore a more complex approximation technique may be used, which includes optimization of filter parameters using criteria as minimization of interpolation errors, or optimization of frequency characteristics, which may include perceptual characteristics as part of the optimization criteria.

The filter parameters used by more complex techniques in PCM stream approximation, are the result of an optimization and are represented as floating point values. However, to make the encoding/decoding processing independent of floating point arithmetic implementations, the encoding used with the present invention will be based on integer computations, and as such the parameters have to be converted or represented by an integer number, both for the Encoding as well as the Decoding.

The Advanced Compression/Decompression technique according to the present invention will deal with all these shortcomings and/or limitations.

3. Advanced Compression & Decompression According to Embodiments of the Present Invention a. Filter Parameters.

Figure 2:
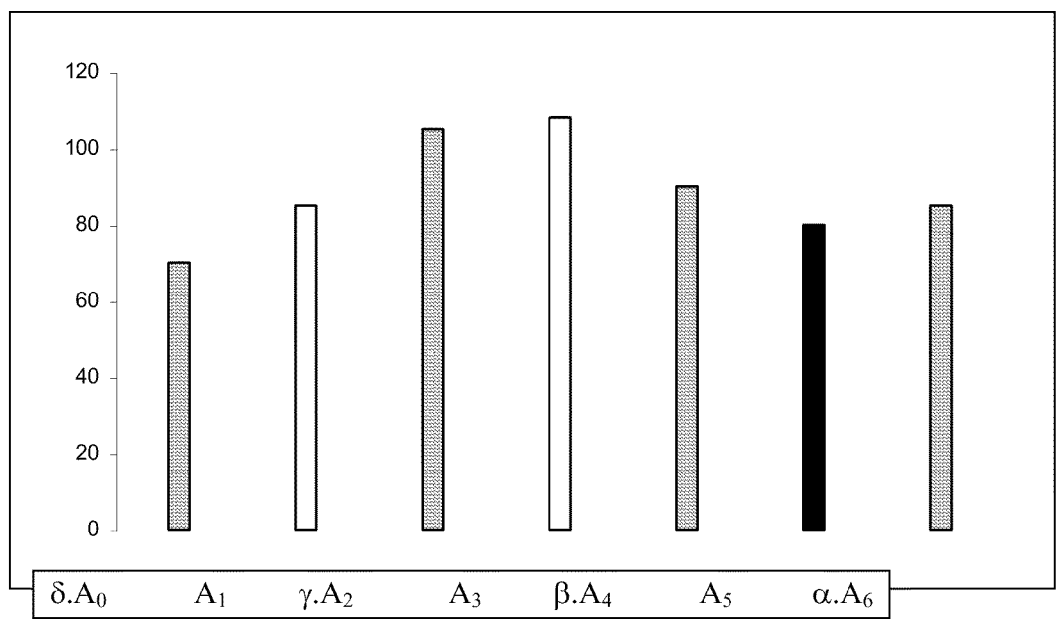
FIG. 2 illustrates sample approximation of sample $A_5$ based on an FIR filter.
Figure 3:
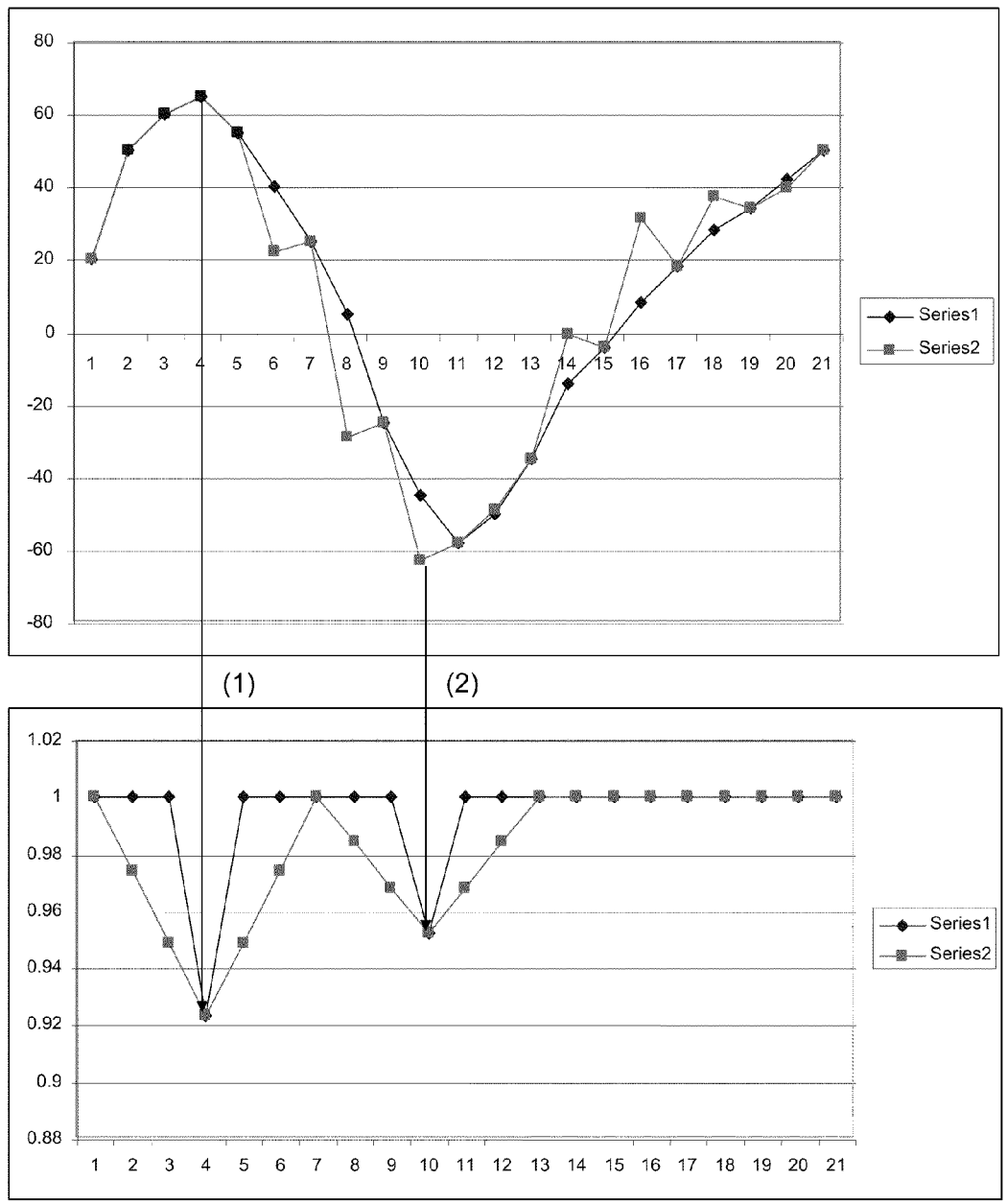
FIG. 3 illustrates audio compression due to interpolation.

For the first PCM stream, the odd samples need to be interpolated. Linear interpolation, as explained in the section about the basic principle, is replaced by a FIR filter, where the filter parameters are optimized as shown in FIG. 2.

The filter parameters are used to approximate the odd samples, e.g. the sample at $A_5$ is generated from the even samples $A_0, A_2, A_4$ & $A_6$. $A'_5 = \alpha \cdot A_6 + \beta \cdot A_4 + \gamma \cdot A_2 + \delta \cdot A_0$.

The general formula for approximation of an odd sample $A'_{2i+5}$ is:

$$A'_{2i+5} = \alpha \cdot A_{2i+6} + \beta \cdot A_{2i+4} + \gamma \cdot A_{2i+2} + \delta \cdot A_{2i}$$

This formula can be used for the basic algorithm when $(\alpha, \beta, \gamma, \delta)$ is defined as $(0.5, 0.5, 0, 0)$, but with the encoder according to embodiments of the present invention, $(\alpha, \beta, \gamma, \delta)$ is the result of an optimization, which will be explained later.

A PCM stream A, with samples $A_0, A_1, A_2, A_3, A_4, A_5, A_6, A_7, \ldots$, is used to generate new stream A'. The new stream A' is an approximation of the first stream A, whereby even samples are being copied from the first PCM stream A, and odd samples are approximated. Samples of A' are: $A'_0, A'_1, A'_2, A'_3, A'_4, A'_5, A'_6, A'_7, \ldots$ with $A'_{2i} = A_{2i}$, & $A'_{2i+5}$ is defined by the formula above for all $i \geq 0$. $A'_i = A_i$ for $i < 5$.

As part of the compression scheme, only the even samples $A'_0, A'_2, A'_4$ are stored, with a parameter indicating that half the sampling rate has to be used during playback and additional parameters $(\alpha, \beta, \gamma, \delta)$ specifying the coefficients of the FIR filter to be used during decoding to regenerate an approximation of the original audio stream.

b. Time Sections & Parameter Integer Mapping

A way to limit the effects of a reading error (reading the samples digitally from the storage device) is to limit the use of these parameters $(\alpha_A, \beta_A, \gamma_A, \delta_A)$ to a restricted number of PCM samples. In fact, the smaller the number of PCM samples these parameters apply to, the better they can be tuned during the compression process to reduce the errors of the approximation.

As mentioned earlier, the filter parameters $(\alpha, \beta, \gamma, \delta)$ are optimized and results are floating point numbers. These numbers are represented by integers because the compression and decompression algorithm is implemented with integer operations, to make it portable and independent of floating point implementations. A conversion from floating point to integer like defined for the 'multi channel compatible stereo recording' can be used for this embodiment also. It should be trivial for someone skilled in the art, to apply such conversion to 15 bit signed values in stead of 16 bit or to reduce the BASE numbers to 3 bit.

Furthermore, in this embodiment, the restricted set of additional parameters have to be embedded in the least significant bit(s) of the PCM audio data. Such embedding requires a syncronisation pattern, such that a decompressor can detect based on such sync pattern when a new set of additional parameters $(\alpha, \beta, \gamma, \delta)$ has been embedded. A simple way to do so, is to create for example a sync pattern of 16 consecutive 1 bits, (each bit of the embedded data using a least significant bit of a PCM sample) and further on only use 15 bits to hold data with every 16$^{th}$ bit set to zero. The next sync is embedded by having 16 consecutive bits set to 1. (This is similar to sync patterns as used in serial MIDI data, where only 7 out of 8 bits are used for data . . . )

Further, during compression or encoding, once the parameters ($\alpha$, $\beta$, $\gamma$, $\delta$) are calculated, these parameters can be embedded in the least significant bits of previous PCM samples, such that at time of decoding, these parameters are available to the decoder/decompressor prior to receiving the PCM samples, which are used in combination with these parameters to calculate the approximated samples. As such, the latency or delay introduced by the decompression/decoding process is no more than 1 sample; a channel which initially had a sample rate of 44 kHz, is first reduced to 22 kHz, and during decoding, as soon as samples $A_{2i+6}$, $A_{2i+4}$, $A_{2i+2}$, $A_{2i}$ are available, $A_{2i+5}$, can be calculated, introducing a delay of 1 sample at 22 kHz or 2 samples at 44 kHz before the 44 kHz samples can be transferred further or send to a Digital Analogue Convertor.

Conclusion at this stage is as follows:

For each section of typically a few msec (depends on the sample rate used) from a single 15 bit mono 44.1 kHz PCM stream, the encoder according to embodiments of the present invention defines a filter parameter set ($\alpha$, $\beta$, $\gamma$, $\delta$) and converts these parameters into four 15 bit signed numbers (A,B,C,D) with each a leading zero bit and one 15 (actually 4×3) bit BASE number with a leading zero bit. Furthermore, a 16 bit sync number is required (16× one bit) This totals to 6 16 bit values (4+1+1), required for decompression or decoding operations per channel. In the case of a 44.1 kHz PCM stream, sample rate reduced to 22.05 kHz, this is equivalent to 4.35 msec.

c. Parameter Optimization.

As explained in the section hereinabove about the Filter parameters used by the encoder/decoder in accordance with embodiments of the present invention, the filter parameters ($\alpha$, $\beta$, $\gamma$, $\delta$) have to be optimized. The parameters are used for approximation of a section of 1 mono 15 bit 44.1 kHz PCM stream. Such a section is equivalent to a few msecs. Optimization of the parameters requires optimization criteria. Similar optimization criteria as defined for 'multi channel compatible stereo recording' may apply.

d. Integer Implementation.

The Encoding Process according to embodiments of the present invention requires several steps. There is started from an original stream A, and next the filter parameters are optimized for sections of a few msecs. Using these filters A' is obtained as an approximated stream during decompression or decoding As explained in previous paragraphs, the decoder and encoder will be implemented using integer operations, to make the encoding and decoding independent of floating point arithmetic implementation. For the 'multi channel compatible stereo recording', because of this approach, rounding errors are introduced. This is true for formulas like: $A^*_{2i+5} = \alpha \cdot A''_{2i+6} + \beta \cdot A''_{2i+4} + \gamma \cdot A''_{2i+2} + \delta \cdot A''_{2i}$ or $A''_{2i+6} = (1/\alpha) \cdot (A^*_{2i+5} - A''_{2i+4} - \gamma \cdot A''_{2i+2} - \delta \cdot A''_{2i})$. but this is not an issue in this current embodiment, as the inverse formula to calculate $A''_{2i+6}$ is not required here; only $A^*_{2i+5}$ is calculated based on $A''_{2i+6}$, $A''_{2i+4}$, $A''_{2i+2}$, $A''_{2i}$ and for example rounding errors introduced by calculation of $A^*_{2i+5}$ have no effect on the calculation of $A^*_{2i+7}$.

In a further aspect, the present invention Midi and Lyrics data are included in the encoder format in such case the section length should be increased to for example 10 msecs, such that apart from the additional filter and sync parameters some bandwidth of additional parameters is available to store midi data. Time stamped midi date (as described in the 'multi channel compatible stereo recording' can be used as well.

From the above it will be appreciated that the present invention relates to an encoder for compressing a plurality of independent mono audio channels into a recording and generating a restricted set of additional parameters used to master an audio track of a storage device, each audio channel comprising a first number of samples per unit time, the plurality of independent mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The present invention also relates to a decoder for decoding a plurality of recorded mono audio channels in a recording using a restricted set of additional parameters for mastering an audio track of a storage device, each audio channel being reconstructed from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

The present invention also relates to a storage device having stored thereon a plurality of recorded mono audio channels in a recording using a restricted set of additional parameters for mastering an audio track of the storage device, each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

In one aspect the Encoder/Decoder according to the present invention can be used to compress or encode a channel, e.g. 44.1 kHz 15 bit mono, into an audio recording, 22.05 kHz 15 bit, which generates a set of additional data parameters. The recording can be made on any suitable recording medium such as a solid state memory device or an optical disk. For example, these additional data parameters are copied to a a solid state disk, or embedded as data in the least significant bits of the audio channel, along the PCM audio sample data. The decoder is capable of regenerating the channel perceived as the original channel.

It is further understood, that the methods are given as examples, both the bit size (16 bit) and the sample rates being used in these examples. For someone skilled in the art, applying such methods for compressing for example 24 bit audio signals, using the least 4 significant bits to store the restricted set of additional parameters should be trivial.

The invention claimed is:

1. An encoder for compressing a plurality of independent mono audio channels into a recording using a lower sample rate and generating a restricted set of additional parameters used to master an audio track of a storage device, each channel comprising a first number of samples per unit time, the plurality of compressed independent mono audio channels being constructed such that the storage device can be played using a solid state disk player so that in a first mode all of the plurality of the compressed independent mono audio channels are played as the recording and in a second mode at least one of the plurality of compressed independent mono audio channels can be played using the recording, the playback being perceived as recorded at higher sample rates, the plurality of independent mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

2. The encoder of claim 1, wherein the storage device is a solid state disk.

3. The encoder of claim 2, wherein the restricted set of additional parameters can be embedded in the least significant bits of the audio recording.

4. A decoder for reconstructing, in a first mode, a plurality of independent mono audio channels in a recording using a restricted set of additional parameters used to master an audio track of a storage device when reading only the audio recording and the additional parameters from the storage device and in a second mode at least one of the plurality of independent mono audio channels can be played as the recording, the playback being perceived to be recorded at higher sample rates, each audio channel being reconstructed from a first number of samples per unit time each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

5. The decoder according to claim 4 wherein the reconstructed channels are perceptually substantially identical to the original mono channels.

6. An audio system comprising an encoder according to claim 1 and a decoder according to claim 4.

7. The audio system according to claim 6, wherein Midi data is integrated on the storage device.

8. The audio system according to claim 7 wherein the decoder has means for executing the inverse operation of the encoder and both decoder and encoder are implemented in 32bit integer arithmetic, being independent of floating point implementation.

9. The audio system according to claim 8, wherein the encoder generates approximated audio channels, using audio filter parameters generated as floating point values first, which are results from optimization with user configurable targets, which may include perceptual audio characteristics.

10. The audio system according to claim 7, wherein audio filter parameters required by the decoder and which are a part of the Data Parameter set, are regenerated for every time period which is short compared to the audio resolution of the human ear.

11. The audio system according to claim 6, wherein the operations required by the decoder for reconstructing the channels, perceived as substantially identical to the original channels, are restricted to a few integer multiplications and summations.

12. The audio system, according to claim 6 wherein the restricted set of additional parameter can be embedded in the least significant bits of the audio channel on the storage device.

13. The audio system according to claim 12, wherein the latency or delay introduced by the decoder can be reduced to 1 sample at the sample rate used for the recording stored, when the restricted set of additional parameters is embedded in the least significant bits of the audio channel such that these parameters are available to the decoder prior to reading the samples to which there parameters have to be applied.

14. A storage device having stored thereon a plurality of recorded mono audio channels in a recording using a restricted set of additional parameters for mastering an audio track of the storage device, each audio channel being reconstructable from a first number of samples per unit time, the plurality of mono audio channels being stored on the storage device as less than the number of samples per unit time from each audio channel with the addition of calculated values, calculated using an interpolating filter with filter parameters, for intermediate samples, the calculated intermediate samples approximating the intermediate samples of the audio channels, the filter parameters being stored on the storage device in the additional parameters.

* * * * *